Patented Oct. 11, 1938

2,132,782

UNITED STATES PATENT OFFICE 2,132,782

NEW PLASTIC MATERIAL AND PROCESS FOR MANUFACTURING THE SAME

Auguste Fernbach, Paris, France

No Drawing. Application April 6, 1937, Serial No. 135,355. In France October 2, 1936

10 Claims. (Cl. 106—30)

This invention relates to a new industrial product constituted by a plastic material to which can be given at will various aspects: wood, stone, marble, ivory, bronze, &c. Moreover, this material has the property of being at the same time light, incombustible, insulating, heat-proof and waterproof. Owing to its hardness and to its resistance, it can be sawn, planed, nailed, screwed, polished.

This plastic material can have for instance the following composition:

| | Grams |
|---|---|
| Paper pulp in powder form | 670 |
| Casein | 100 |
| Syrupy potassium silicate | 100 |
| Syrupy sodium silicate | 50 |
| Calcium carbonate, rosin, kaolin, magnesia, 20 grams of each | 80 |

The whole forming 1,000 grams of material.

It is to be understood that the composition indicated above can vary to a relatively large extent according to the result which is to be obtained. In particular, the paper pulp can be replaced, totally or partially, by sawdust, by rag powder and by other cellulosic materials, without substantially modifying the essential and characteristic properties of the product obtained.

The invention also relates to a process for the manufacture of the plastic material above mentioned.

In accordance with the invention, potassium silicate is mixed with calcium carbonate, and then sodium silicate, rosin, kaolin and magnesia are added.

Before utilizing them, both silicates are diluted with about twice their volume of water.

The mixture is subjected, in the course of its preparation, to a continuous and thorough kneading, in an apparatus provided with suitable agitators, and a perfectly homogeneous mass is thus obtained.

During this kneading, a diluted acid, hydrochloric acid for instance, is added in a quantity smaller than that which would be necessary for completely neutralizing the alkalinity of the silicates. The dilution of the acid is an essential condition for slowly producing the precipitation of silica in a highly divided gelatinous form, in order that this jelly should be uniformly distributed in the entire mass and should imbed all the solid particles constituting it.

Finally, casein in a form of a fine powder is incorporated to the mass. It can be added, according to circumstances, in a single batch or in two batches, a portion before, the other after incorporation of the paper pulp. Each addition of casein must be followed by the addition of very diluted formol, in sufficient quantity for giving to the casein the form of a solid jelly. It may be advantageous, before adding it to the mixture, to treat a portion of the casein with a diluted alkali, such as caustic soda.

After addition of casein, or between the two additions if it is added in two batches, the paper pulp powder is incorporated, either in the dry state, or previously moistened, according to circumstances, to the mass, still powerfully kneaded.

As will be seen, the essential substances for obtaining a highly plastic, tough and resistant paste or pulp, are of two kinds and are both produced in the midst of the mixture: the silica jelly and the casein jelly, the first constituted by a mineral material and the second by a nitrogenous organic material.

Immediately after production, by mixing, of a mass perfectly homogeneous and having the required consistency (which consistency depends, on the one hand, on the correct proportioning of the water used and, on the other hand, on the powerfulness of the final kneading which must increase with the increasing resistance of the paste or pulp), the kneading is completed by the action of a compression roll; then, the product is introduced in a mould in which it is subjected to the action of a press capable of exerting a high pressure on the material. The great plasticity of the paste or pulp imparts to the same the valuable property of faithfully reproducing all the details of the mould.

The product removed from the mould is finally subjected to a drying action in a stream of dry air. The drying must not be too rapid, as the product might be liable to buckle or warp or to become distorted. It is advisable, particularly for the production of plates, to exert a pressure by means of resistant gratings loaded with weights during the first stages of the drying, which may take several days, particularly if thick articles are to be obtained. The duration of the drying is moreover considerably influenced by the importance of the compression to which the product has been subjected under the press.

What I claim is:—

1. A process for the manufacture of plastic material comprising mixing together potassium silicate and calcium carbonate, adding thereto sodium silicate, rosin, kaolin and magnesia, subjecting the mixture to a kneading operation, and during kneading converting the silicate into highly dispersed jelly form by adding a diluted acid thereto, adding casein to the mixture, adding formaldehyde to give to the casein the form of a solid jelly and thereafter incorporating a cellulosic material in the mixture.

2. In the process as claimed in claim 1 the feature of diluting potassium silicate and sodium silicate with about twice their volume of water.

3. In the process as claimed in claim 1 adding to the mixture during the kneading operation hydrochloric acid in a quantity smaller than that which would be necessary for completely neutralizing the alkalinity of the silicates.

4. In the process as claimed in claim 1 adding the casein in the form of a fine powder.

5. In the process as claimed in claim 1 treating a portion of the casein with a diluted alkali, before its addition to the mixture.

6. In the process as claimed in claim 1 pressing and moulding the homogeneous mass obtained after final kneading of the mixture, removing the moulded product from the mould and drying in a stream of dry air.

7. In the process as claimed in claim 1 the feature of producing two jellies in the midst of the mixture, one of which is formed by a mineral material and the other by a nitrogenous organic matter.

8. In the process as claimed in claim 1 the feature of producing in the midst of the mixture two jellies one of which is composed of silica and the other of casein.

9. An article of manufacture composed of cellulosic material, casein, syrupy potassium silicate, syrupy sodium silicate, calcium carbonate, rosin, kaolin and magnesia, hydrochloric acid and formaldehyde.

10. An article of manufacture having the following composition:

| | Grams |
|---|---|
| Paper pulp in powder form | 670 |
| Casein | 100 |
| Syrupy potassium silicate | 100 |
| Syrupy sodium silicate | 50 |
| Calcium carbonate | 20 |
| Rosin | 20 |
| Kaolin | 20 |
| Magnesia | 20 |

AUGUSTE FERNBACH.